US009630491B2

(12) United States Patent
Larkin et al.

(10) Patent No.: US 9,630,491 B2
(45) Date of Patent: *Apr. 25, 2017

(54) TRANSFER CASE WITH STATIONARY LOW RANGE PLANETARY (71) Applicant: Magna Powertrain, Inc., Concord (CA)

(72) Inventors: Bradley R. Larkin, Shelby Township, MI (US); Douglas O. Bradley, Sterling Heights, MI (US)

(73) Assignee: Magna Powertrain, Inc., Concrod (CA)

( * ) Notice: Subject to any disclaimer, the term of this patent is extended or adjusted under 35 U.S.C. 154(b) by 70 days.

This patent is subject to a terminal disclaimer.

(21) Appl. No.: 14/714,460

(22) Filed: May 18, 2015

(65) Prior Publication Data
US 2015/0246611 A1 Sep. 3, 2015

Related U.S. Application Data (63) Continuation of application No. 14/000,498, filed as application No. PCT/US2011/064843 on Dec. 14, 2011, now Pat. No. 9,033,842.

(60) Provisional application No. 61/450,816, filed on Mar. 9, 2011.

(51) Int. Cl.
*B60K 23/08* (2006.01)
*B60K 17/344* (2006.01)
*F16H 37/06* (2006.01)
*F16H 63/16* (2006.01)
*F16H 63/30* (2006.01)

(52) U.S. Cl.
CPC ............ *B60K 17/344* (2013.01); *B60K 23/08* (2013.01); *F16H 37/065* (2013.01); *F16H 63/16* (2013.01); *F16H 63/3069* (2013.01)

(58) Field of Classification Search
CPC ..... B60K 17/344; B60K 23/08; F16H 37/065; F16H 63/16
See application file for complete search history.

(56) References Cited

U.S. PATENT DOCUMENTS

| 5,363,938 | A | | 11/1994 | Wilson et al. |
| 5,380,255 | A | | 1/1995 | Brissenden et al. |
| 5,613,587 | A | * | 3/1997 | Baxter, Jr. ........... B60K 17/344 192/53.1 |
| 5,711,740 | A | | 1/1998 | Bakowski |
| 5,833,566 | A | | 11/1998 | Showalter |

(Continued)

*Primary Examiner* — Sherry Estremsky
(74) *Attorney, Agent, or Firm* — Dickinson Wright PLLC (57) ABSTRACT A transfer case includes an input shaft, first and second output shafts and a planetary gearset having a sun gear, a ring gear and a pinion gear meshingly engaged with the sun and ring gears. A range actuator includes first, second and third range sleeves abutted in series being axially translatable between a first position to provide a drive connection between the input shaft and the first output shaft, a second position providing a direct drive ratio connection between the input shaft and the first output shaft as well as the input shaft and a second output shaft, and a third position to provide a reduced speed drive ratio connection between the input shaft and the first output shaft as well as the input shaft and the second output shaft. The gears of the planetary gearset are not driven when the range sleeves are at the first and second positions.

21 Claims, 7 Drawing Sheets (56) References Cited

U.S. PATENT DOCUMENTS

| | | | |
|---|---|---|---|
| 5,916,051 A | 6/1999 | Schleuder et al. | |
| 9,033,842 B2 * | 5/2015 | Larkin | B60K 17/344 |
| | | | 475/198 |
| 2013/0345015 A1 | 12/2013 | Larkin et al. | |

* cited by examiner

TRANSFER CASE WITH STATIONARY LOW RANGE PLANETARY

CROSS-REFERENCE TO RELATED APPLICATIONS

This application is a continuation of U.S. application Ser. No. 14/000,498 filed Sep. 9, 2013 which is a National Stage of International Application No. PCT/US2011/064843 filed Dec. 14, 2011 and which claim the benefit and priority of U.S. Provisional Application No. 61/450,815 filed Mar. 9, 2011. The entire disclosure of each of the above applications is incorporated herein by reference.

BACKGROUND

Transfer cases may be equipped with a reduction gearset to provide a low range operating mode. Many of the previously constructed transfer cases include an input shaft that is continuously connected at all times to a sun gear of a planetary gearset. Therefore, the members of the planetary low range gearset rotate during all modes of transfer case operation. Rotating the gears of the planetary gearset increases drag on the system and results in a lower efficiency power transfer system. Accordingly, it may be beneficial to provide a planetary gearset that is not driven when torque is not transferred through the low-range gearset.

SUMMARY

This section provides a general summary of the disclosure, and is not a comprehensive disclosure of its full scope or all of its features.

A transfer case includes an input shaft, first and second output shafts and a planetary gearset. The planetary gearset includes a sun gear, a ring gear and a pinion gear meshingly engaged with the sun and ring gears. A range actuator includes first, second and third range sleeves abutted in series being axially translatable between a first position to provide a drive connection between the input shaft and the first output shaft, a second position providing a direct drive ratio connection between the input shaft and the first output shaft as well as the input shaft and a second output shaft, and a third position to provide a reduced speed drive ratio connection between the input shaft and the first output shaft as well as the input shaft and the second output shaft. The gears of the planetary gearset are not driven when the range sleeves are at the first and second positions.

A transfer case includes an input shaft, a first output shaft and a second output shaft. A planetary gearset includes a sun gear, a ring gear, a carrier and a pinion gear rotatably supported by the carrier. The pinion gear is meshingly engaged with the sun and ring gears. A range actuator includes first and second range sleeves axially translatable between a first position to provide a drive connection between the input shaft and the first output shaft. At a second first and second range sleeve position, a direct drive ratio connection between the input shaft and the first output shaft as well as the input shaft and the second output shaft is provided. At a third position a reduced speed drive ratio connection exists between the input shaft and the first output shaft as well as the input shaft and the second output shaft via the planetary gearset. The gears of the planetary gearset are not driven when the range sleeves are at the first position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

With reference to the Figures, a transfer case constructed in accordance with the teachings of the present disclosure is identified at reference numeral 10. Transfer case 10 is operable to transfer torque from the input shaft 12 to one or both of a first output shaft 14 and a second output shaft 16. First output shaft 14 is drivingly coupled to a first set of driven wheels. Second output shaft 16 is drivingly coupled to the second set of driven wheels.

Transfer case 10 is operable to transmit torque from input shaft 12 to the vehicle wheels via sets of sliding splines as will be described. Depending on the position and engagement of the splines, power may be transferred from input shaft 12 to only first output shaft 14 in a two wheel high/four wheel drive automatic mode via the use of an active clutch (not shown), a four wheel drive high Lock mode and a four wheel drive Low mode of operation. A neutral position is also provided. The components of transfer case 10 are arranged such that input shaft 12 may be disconnected from components of a planetary gearset 18 such that the planetary is stationary until torque is required to be transferred through planetary gearset 18. Vehicle efficiency is not a main goal when transfer case 10 operates in the low range. As such, the additional drag associated with rotating the components of planetary gearset 18 in this mode is acceptable.

Transfer case 10 includes a range actuator 20 operable to selectively translate a first range sleeve 22, a second range sleeve 24 and a third range sleeve 26 to a number of different axial positions to provide the drive modes previously described. Range actuator 20 may include a screw 30 drivingly engaged with first range sleeve 22 such that rotation of screw 30 axially translates first range sleeve 22.

First range sleeve 22 includes a spline 32 engaged with a spline 34 formed on first output shaft 14. A set of clutch teeth 36 are also formed on first range sleeve 22. Second range sleeve 24 abuts first range sleeve 22 and includes a spline 38 drivingly engaged with spline 34 of first output shaft 14 and a spline 40 formed on input shaft 12. Clutch teeth 42 are formed on second range sleeve 24. Third range sleeve 26 abuts second range sleeve 24 and includes a spline 48 drivingly engaged with a spline 50 of a drive sprocket 52. Drive sprocket 52 forms a portion of a transfer mechanism 54 operable to transfer torque to second output shaft 16. More particularly, a flexible member such as a chain 58 drivingly engages drive sprocket 52 as well as a driven sprocket 60. Driven sprocket 60 is fixed for rotation with second output shaft 16. Clutch teeth 62 and 64 are formed at spaced apart locations on third range sleeve 26.

Planetary gearset 18 includes a ring gear 70 fixed to a housing 72 of transfer case 10. A sun gear 74 is provided with clutch teeth 76. A plurality of pinion gears 78 are drivingly engaged with ring gear 70 and sun gear 74. A plurality of pins 80 support pinion gears 78 for rotation thereon. A first carrier plate 84 is rotatably supported by a bearing 86 and includes a plurality of clutch teeth 88. First carrier plate 84 supports pins 80. A second carrier plate 90 also supports pins 80 and includes clutch teeth 94.

Figure 1:
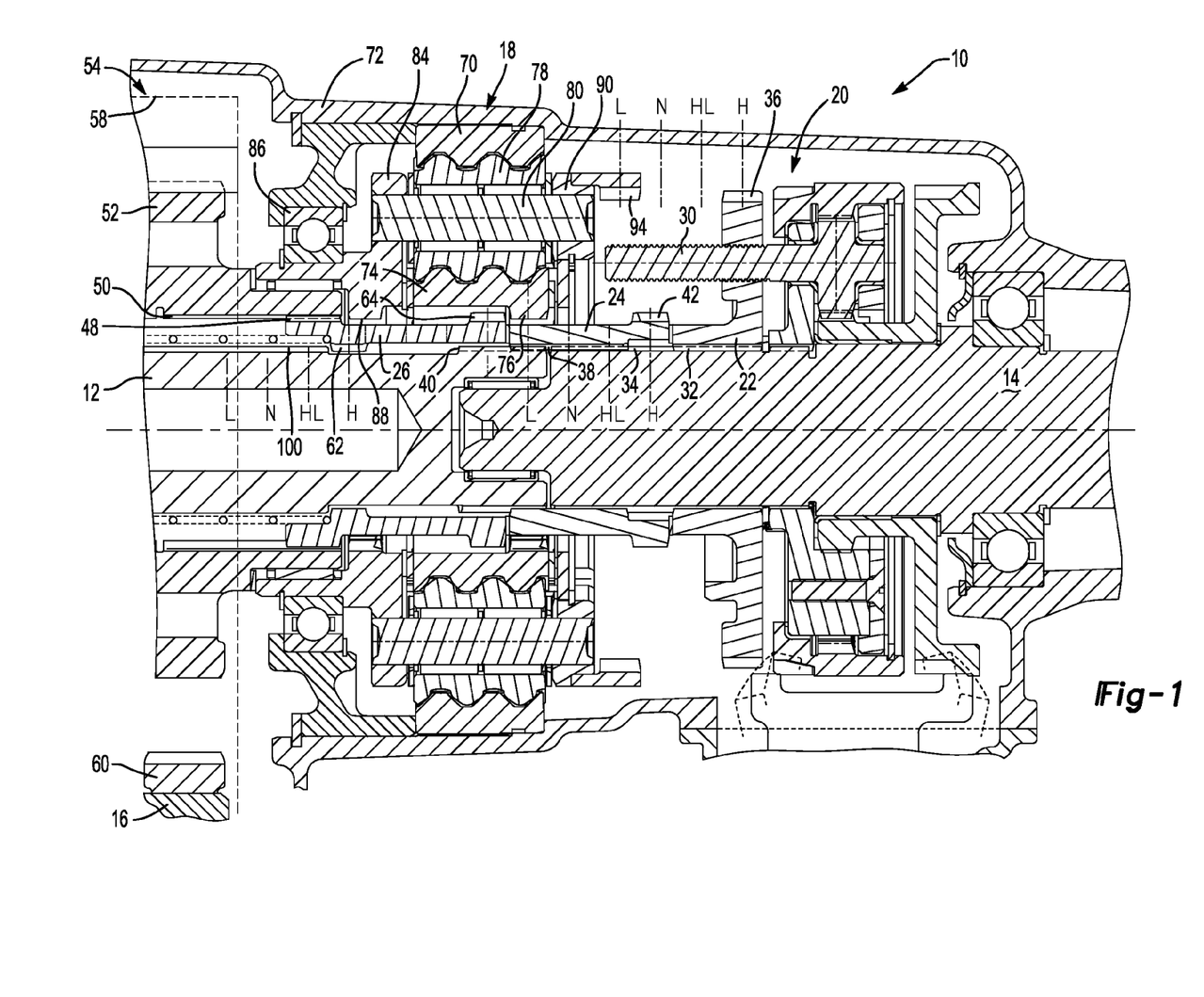
FIG. 1 is a fragmentary sectional view of a transfer case constructed in accordance with the teachings of the present disclosure.
Figure 2:
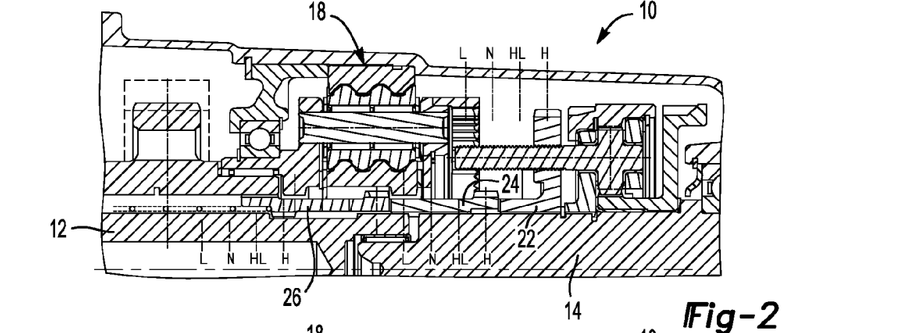
FIGS. 2-5 depicts various elements of the planetary gearset in different positions to provide a two wheel drive high range mode, a four wheel drive high range locked mode, a neutral mode, and a four wheel drive low mode of operation.

FIGS. 1 and 2 represent transfer case 10 being operated in a two-wheel high drive mode of operation. At this time, torque is transferred from input shaft 12 to second range sleeve 24. Second range sleeve 24 is drivingly engaged with first output shaft 14 to drive the first set of vehicle wheels. The various clutch teeth previously described are disengaged from the components of planetary gearset 18. Operation and efficiency of transfer case 10 is high due to the fact that planetary gearset 18 is not being driven and transfer mechanism 54 is not being driven in the two wheel high drive mode.

Figure 3:
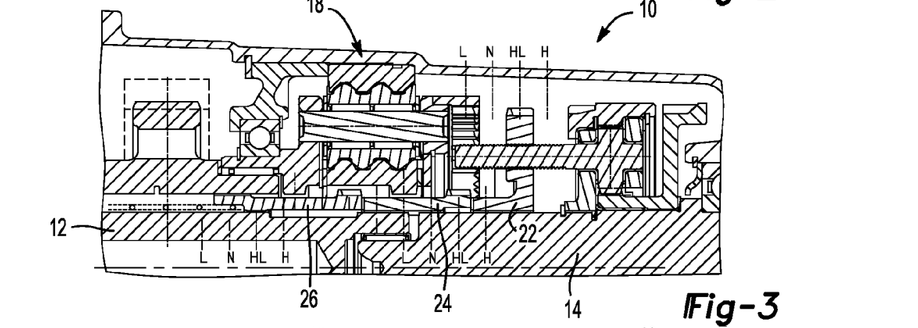

To provide a four wheel drive high lock mode of operation, range actuator 20 rotates screw 30 to axially translate first range sleeve 22 to the position identified as HL shown in FIG. 3. At this time, each of first, second and third range sleeves 22, 24 and 26 are translated to new positions. In particular, third range sleeve 26 is drivingly engaged with input shaft 12 via a set of gear teeth 100 as well as drive sprocket 52. Second range sleeve 24 remains simultaneously engaged with input shaft 12 and first output shaft 14. As such, a four wheel drive high locked mode of operation is provided. It should also be appreciated that during this mode of operation, none of the components of planetary gearset 18 are driven.

Figure 4:
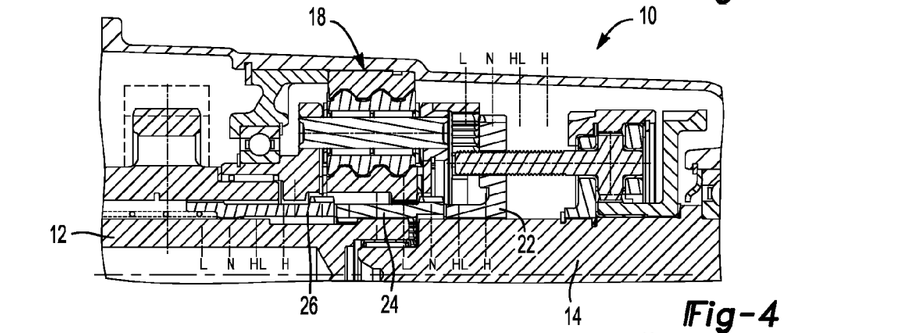

In a neutral mode of operation (FIG. 4), each of first, second and third sleeves 22, 24 and 26 are further axially translated to the positions identified as N. In the neutral mode of operation, teeth 62 and 64 of third range sleeve 26 are disengaged from the other components. Similarly, spline 38 of second range sleeve 24 is disengaged from first output shaft 14. No torque is transferred from input shaft 12 to either first output shaft 14 or second output shaft 16 in the neutral mode of operation.

Figure 5:
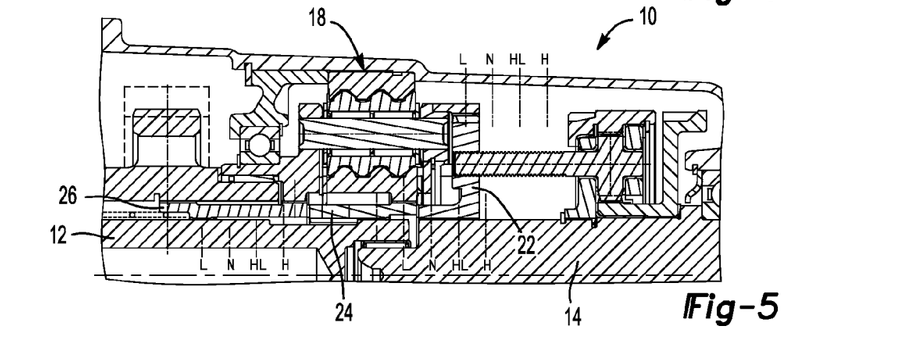

To achieve the four wheel low drive mode, range actuator 20 further axially translates each of the range sleeves to the L position, as shown in FIG. 5. In the four wheel low mode of operation, second range sleeve 24 drivingly connects input shaft 12 with sun gear 74 through the driving interconnection of teeth 42 and teeth 76. Speed is reduced and torque is multiplied through planetary gearset 18 where first carrier plate 84 and second carrier plate 90 act as output members. Torque is transferred from second carrier plate 90 to first range sleeve 22 via meshed engagement of teeth 94 and teeth 36. Similarly, first carrier plate 84 transfers torque to third range sleeve 26 via clutch teeth interconnection 64 and 88. Third range sleeve 26 remains drivingly coupled to drive sprocket 52 to transfer torque to second output shaft 16.

Based on the power flow in the four wheel low drive mode being split between the first carrier plate 84 and second carrier plate 90, the amount of torque that the spline is required to transmit is reduced. As such, the physical size and potentially special manufacturing processes currently used may be eliminated. Furthermore, since low range planetary gearset 18 is stationary until engaged, pointing may be utilized on the range sleeves and sun gear/carrier interface to allow a shift to occur. Pointing minimizes a likelihood that a shift will be blocked and is designed to accelerate the planetary gearset on contact at low speeds.

Figure 6:
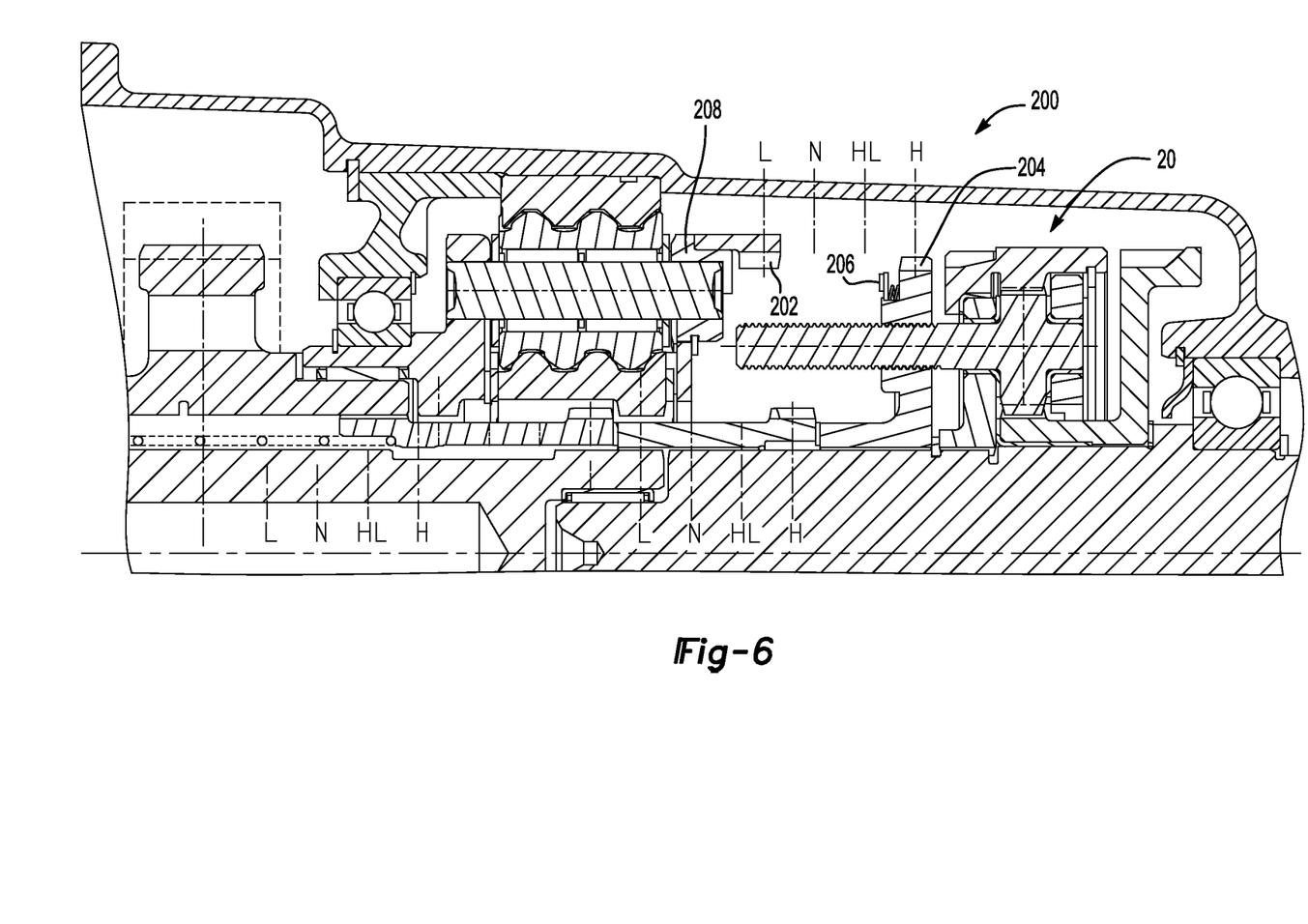
FIG. 6 is a fragmentary sectional view of an alternate transfer case.

FIG. 6 depicts an alternate transfer case at reference numeral 200. Transfer case 200 is substantially similar to transfer case 10. A friction disk 206 is located such that it will contact a second carrier plate 208 before other splines are engaged with the carrier/sun assembly. Accordingly, the assembly is accelerated to match the output shaft speed. This arrangement should be beneficial in reducing shift effort as well as reducing potential clunk in a non-synchronized arrangement.

Figure 7:
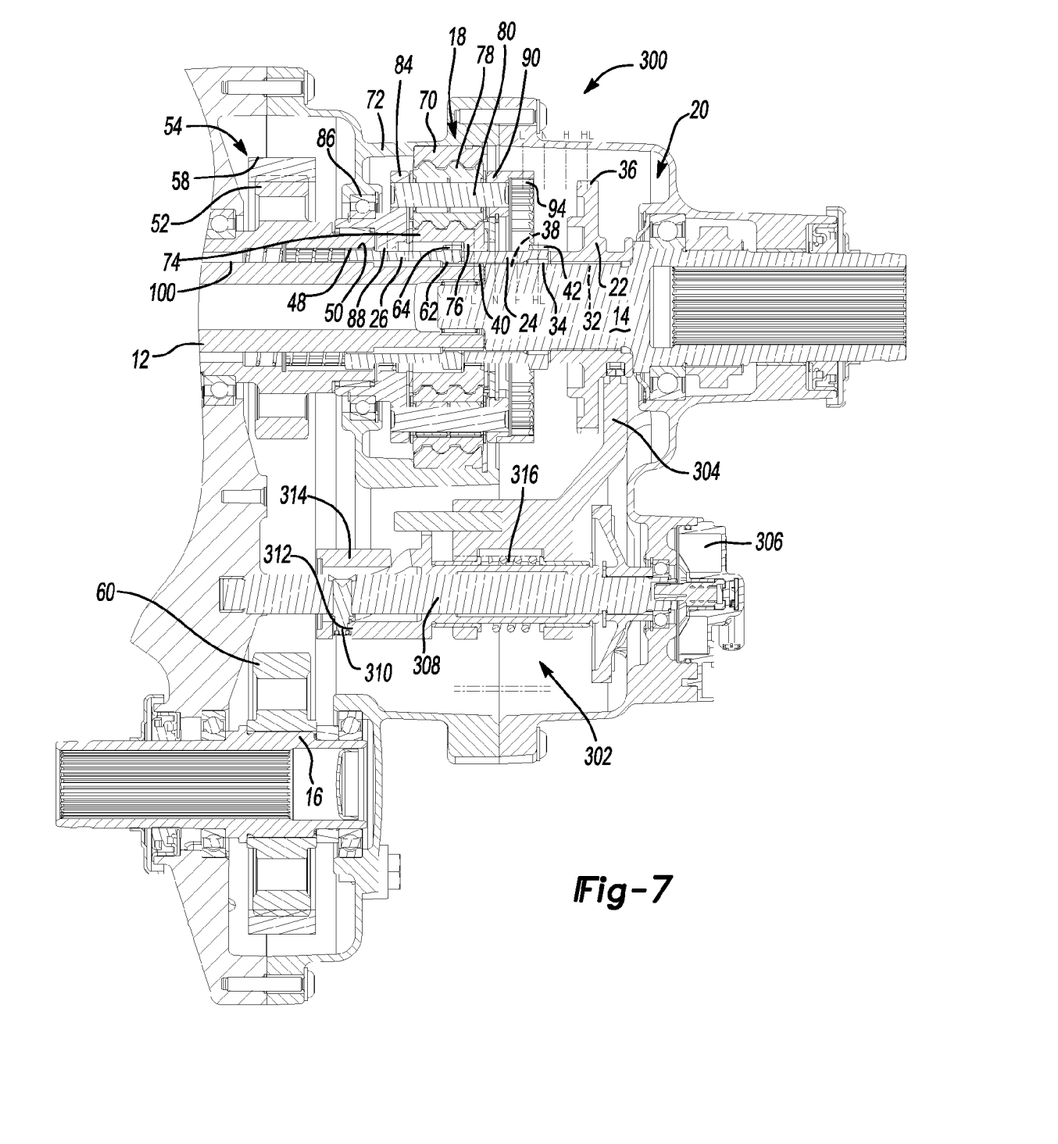
FIG. 7 is a fragmentary sectional view of another alternate transfer case.

FIG. 7 depicts another alternate transfer case identified at reference numeral 300. Transfer case 300 is substantially similar to transfer case 10 with the exception that a range actuator 302 is provided to selectively translate first range sleeve 22, second range sleeve 24 and third range sleeve 26 to the various axial positions previously described. Range actuator 302 includes a shift fork 304 that is driven to various axial positions corresponding to the shift modes previously described. An electric motor 306 is provided to rotate an actuation shaft 308. A pin 310 is positioned within a slot 312 of a carrier 314. Rotation of actuation shaft 308 translates pin 310 and carrier 314. A spring 316 cooperates with carrier 314 and shift fork 304 to temporarily allow carrier 314 to translate while shift fork 304 remains stationary during a blocked shift. Spring 316 continues to load shift fork 304 and first range sleeve 22 toward a desired axial position. Once the blocked shift has cleared, shift fork 304 completes its targeted motion.

Figure 8:
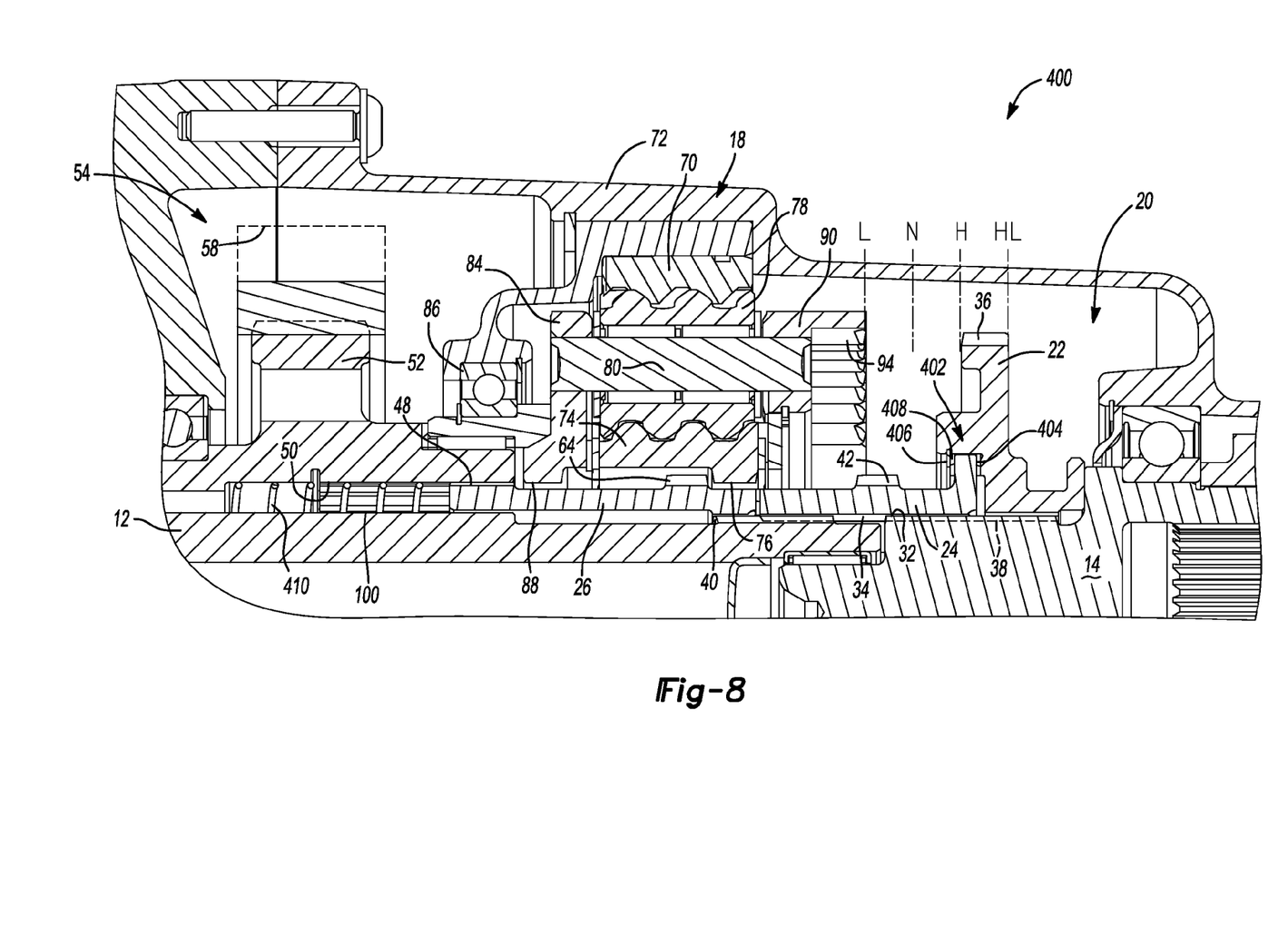
FIG. 8 is a fragmentary sectional view of another alternate transfer case.

FIG. 8 depicts another alternate transfer case identified at reference numeral 400. Transfer case 400 is substantially similar to transfer cases 10 and 300. As such, like elements will retain their previously introduced reference numerals. Transfer case 400 includes a coupling 402 interconnecting first range sleeve 22 and second range sleeve 24. Coupling 402 includes a first thrust washer 404 positioned between first range sleeve 22 and second range sleeve 24. A second thrust washer 406 is positioned between second range sleeve 24 and a snap ring 408. Snap ring 408 is fixed to first range sleeve 22. Coupling 402 couples first range sleeve 22 and second range sleeve 24 for concurrent axial translation with one another. Coupling 402 allows relative rotation between first range sleeve 22 and second range sleeve 24. By interconnecting first range sleeve 22 and second range sleeve 24 in this manner, a spring 410 need only be sized to move third range sleeve 26 toward the right when viewed in FIG. 8 after the range actuator has translated the subassembly of first range sleeve 22 and second range sleeve 24 toward the right. Coordinated movement of first range sleeve 22 and second range sleeve 24 is assured in both axial directions.

Figure 9:
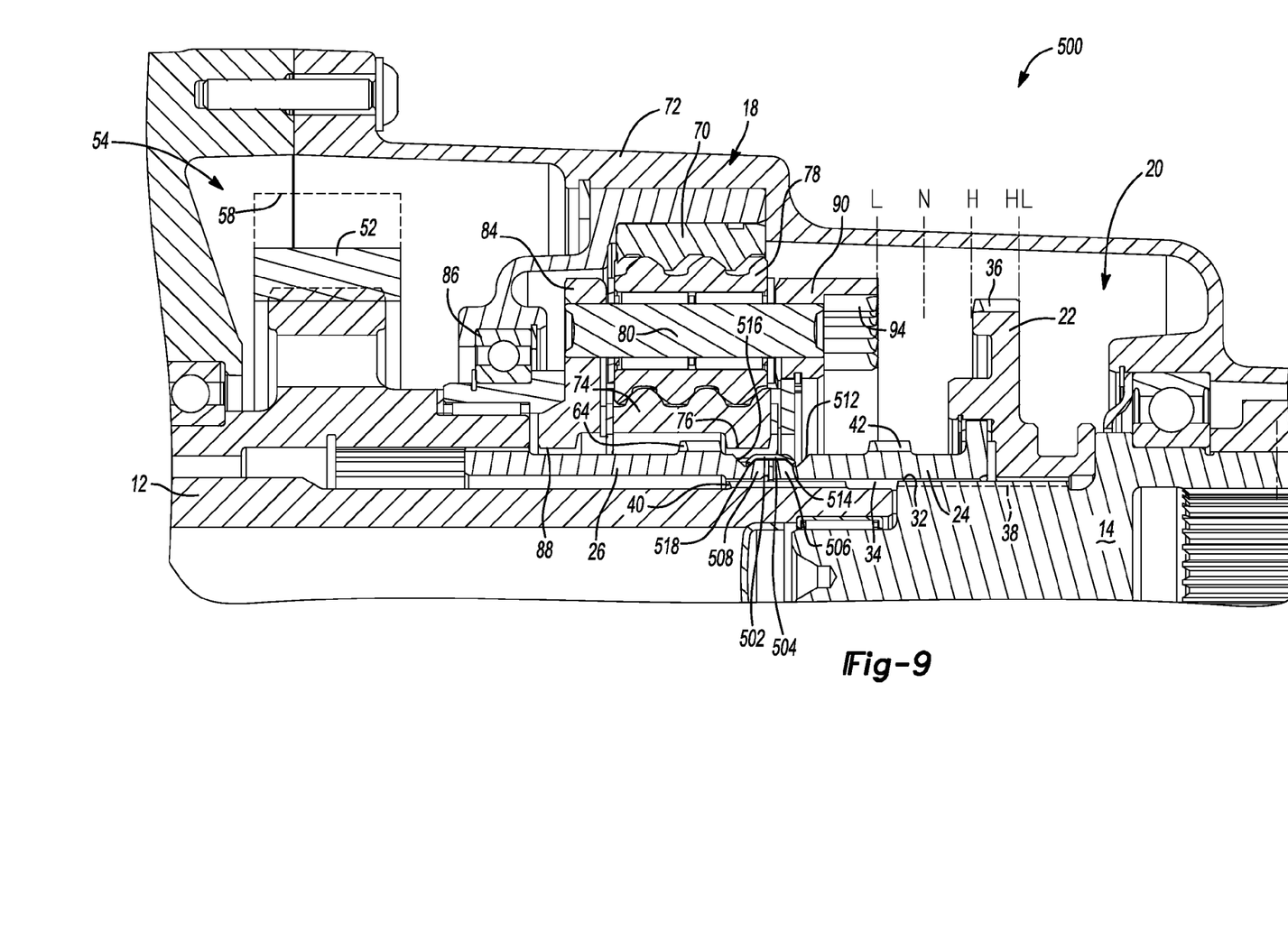
FIG. 9 is a fragmentary sectional view of another alternate transfer case.

FIG. 9 depicts another alternate transfer case at reference numeral 500. Transfer case 500 is substantially similar to transfer case 400 with the exception that second range sleeve 24 is coupled to third range sleeve 26 by a connector 502. Connector 502 may include a metallic sleeve having a cylindrically shaped center portion 504 overlapping an end 506 of second range sleeve 24 and an end 508 of third range sleeve 26. Second range sleeve 24 includes a groove 512 in receipt of a first downturned portion 514 of connector 502. A running clearance exists between cylindrical portion 504, first downturned portion 514 and second range sleeve 24. A groove 516 is formed on third range sleeve 26. Connector 502 includes a second downturned portion 518 positioned within groove 516. Second downturned portion 518 and substantially cylindrical portion 504 are clear of third range sleeve 26 such that second range sleeve 24 is axially coupled to third range sleeve 26 but relative rotation between the second and third range sleeves may occur. It is contemplated that connector 502 is constructed from a malleable metal initially shaped as a cylinder. A crimping operation is used to define first downturned portion 514 and second downturned portion 518. A low cost, low weight coupling is provided.

Figure 10:
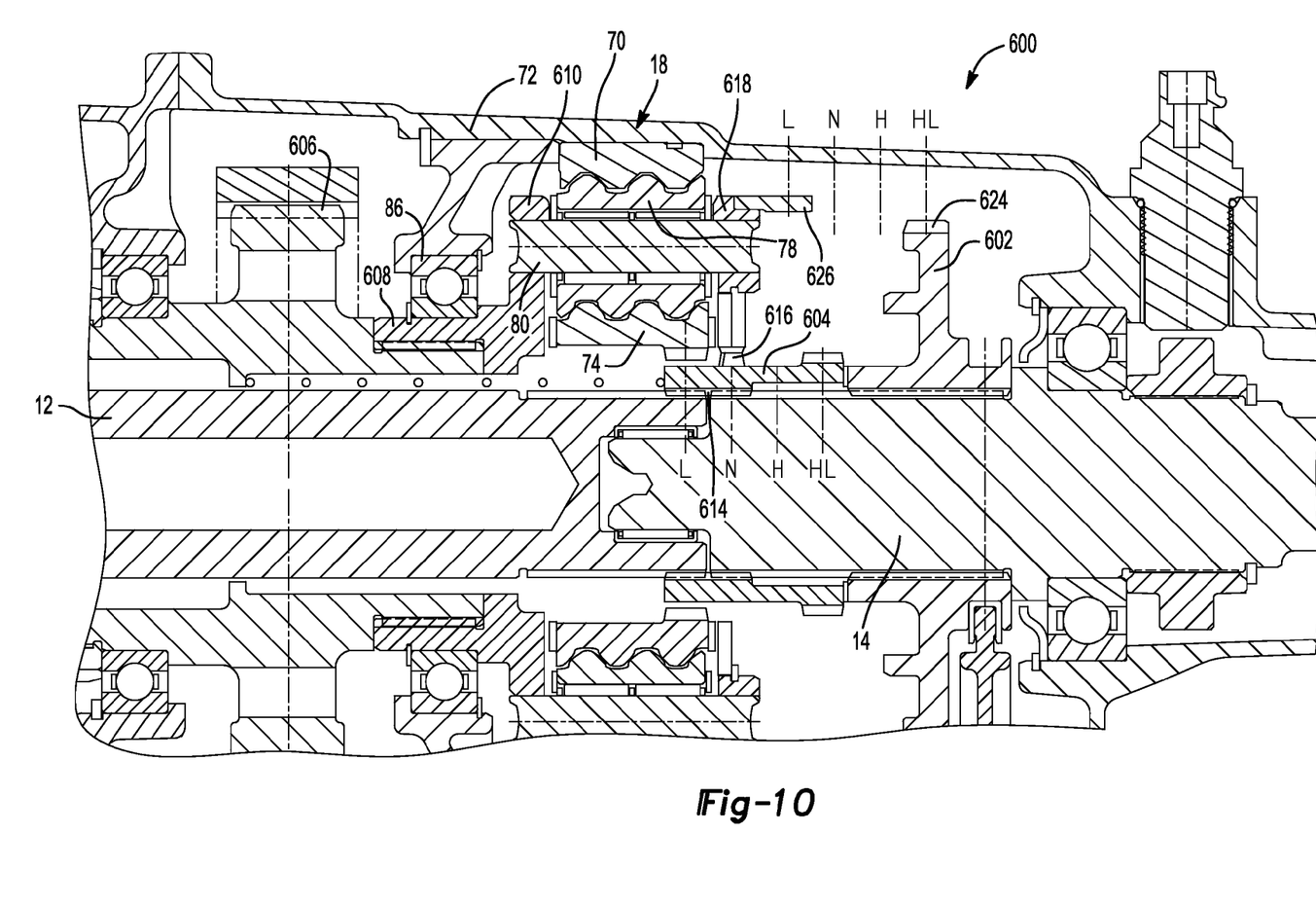
FIG. 10 is a fragmentary sectional view of another alternate transfer case.

FIG. 10 depicts another alternate transfer case identified at reference numeral 600 that functions slightly differently than the previously described transfer cases. Transfer case 600 is a simplified assembly including a first range sleeve 602 and a second range sleeve 604. A third range sleeve is not utilized. Transfer case 600 is operable in a two-wheel drive high mode of operation at which the members of planetary gearset 18 do not rotate. During all four-wheel drive modes of operation, the members of planetary gearset 18 rotate. This is in contrast to the previous power transfer cases where the members of planetary gearset 18 only rotate when the transfer case operates in the four-wheel drive low mode of operation.

Transfer case 600 includes a drive sprocket 606 that is fixed for rotation with a hub portion 608 of a first carrier plate 610. FIG. 10 depicts first range sleeve 602 and second range sleeve 604 at positions to provide a four-wheel drive high lock mode of operation. Second range sleeve 604 directly drivingly interconnects input shaft 12 and first output shaft 14 with an internal spline 614. An external spline 616 is formed on second range sleeve 604 that is drivingly engaged with a spline formed on a rear carrier plate 618. Because rear carrier plate is fixed for rotation with front carrier plate 610, torque from input shaft 12 is transferred through second range sleeve 604 to first output shaft 14, rear carrier plate 618, front carrier plate 610 and drive sprocket 606.

In a two-wheel drive high mode of operation, second range sleeve 604 drivingly connects input shaft 12 with first output shaft 14. A drive connection between second range sleeve 604 and any member of planetary gearset 18 is broken. As such, during the two-wheel drive high mode of operation, the components of planetary gearset 18 are not driven.

In a four-wheel drive low mode of operation, torque is transferred from input shaft 12 through second range sleeve 604 to sun gear 74. Multiplied torque is output from planetary gearset 18 through first carrier plate 610 to drive sprocket 606 as well as through rear carrier plate 618 and first range sleeve 602 via external teeth 624 and internal teeth 626 to first output shaft 14.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A transfer case comprising:
   an input shaft;
   a first output shaft;
   a second output shaft;
   a transfer mechanism drivingly connected to said second output shaft;
   a planetary gearset including a sun gear, a non-rotary ring gear, a carrier, and pinion gears rotatably supported by said carrier and in constant meshed engagement with said sun gear and said ring gear; and
   a range actuator moveable between three distinct positions to establish three distinct drive connections between said input shaft and said first and second output shafts, said range actuator being operable in a first position to drivingly interconnect said first output shaft to said input shaft for establishing a two-wheel high-range drive connection, said range actuator being operable in a second position to drivingly interconnect said first output shaft and said transfer mechanism to said input shaft for establishing a four-wheel high-range drive connection, and said range actuator being operable in a third position to drivingly interconnect said sun gear to said input shaft and to drivingly interconnect said first output shaft and said transfer mechanism to said carrier for establishing a four-wheel low-range drive connection, wherein said planetary gearset is not driven when said range actuator is located in its first and second positions.

2. The transfer case of claim 1 wherein said transfer mechanism includes a first sprocket rotatably mounted on said first output shaft, a second sprocket fixed for rotation with second output shaft, and a chain drivingly connecting said first and second sprockets, wherein said range actuator is operable in its first position to drivingly interconnect said first output shaft with said input shaft and disconnect said first sprocket from said input shaft, wherein said range actuator is operable in its second position to drivingly interconnect said first output shaft and said first sprocket with said input shaft, and wherein said range actuator is operable in its third position to drivingly interconnect said sun gear to said input shaft and to drivingly interconnect said carrier to said first output shaft and said first sprocket.

3. The transfer case of claim 2 wherein said range actuator includes first, second and third range sleeves and a range shift mechanism for concurrently moving said first, second and third sleeves between said first, second and third positions, wherein said range actuator is operable in its first position so as to cause said second range sleeve to interconnect said first output shaft for common rotation with said input shaft, wherein said range actuator is operable in its second position so as to cause said second range sleeve to maintain a driving interconnection between said input shaft and said first output shaft while also causing said third range sleeve to interconnect said first sprocket for common rotation with said input shaft, and wherein said range actuator is operable in its third position so as to cause said second range sleeve to interconnect said sun gear for common rotation with said input shaft, to cause said first range sleeve to interconnect a first carrier member of said carrier for common rotation with said first output shaft, and to cause said third range sleeve to interconnect a second carrier member of said carrier for common rotation with said first sprocket.

4. The transfer case of claim 3 wherein said first, second and third range sleeves abut in a series relationship and are rotatable relative to reach other, and wherein said first, second and third range sleeves are coaxially aligned with said input shaft and said first output shaft.

5. The transfer case of claim 4 wherein said first range sleeve is splined for rotation with said first output shaft and has clutch teeth configured to engage clutch teeth formed in said first carrier member when located in said third position, wherein said second range sleeve has internal splines meshed with external splines formed on said first output shaft and said input shaft when located in said first and second positions and which only mesh with said external splines on said input shaft when located in said third position, said second range sleeve further including clutch teeth configured to engage clutch teeth formed on said sun gear when located in said third position, and wherein said third range sleeve is splined for common rotation with said first sprocket and includes internal splines configured to engage external splines formed on said input shaft when located in said second and third positions, said third range sleeve further including clutch teeth configured to engage clutch teeth formed on said second carrier member when located in said third position.

6. The transfer case of claim 4 further comprising a first connector operably disposed between said first and second range sleeves and configured to facilitate common axial movement while permitting relative rotation therebetween, and a second connector operably disposed between said second and third range sleeves and configured to facilitate common axial movement while permitting relation rotation therebetween.

7. The transfer case of claim 1 further comprising a power-operated device for selectively moving said range actuator between its first, second and third positions.

8. The transfer case of claim 7, wherein said planetary gearset is disposed between said power-operated device and said transfer mechanism.

9. A transfer case, comprising:
an input shaft rotatable about a first rotary axis;
a first output shaft rotatable about said first rotary axis relative to said input shaft;
a second output shaft rotatable about a second rotary axis offset from said first rotary axis;
a transfer component driven by said second output shaft and rotatable about said first rotary axis;
a planetary gearset aligned with said first rotary axis and including a first rotary component and a second rotary component that is supported for rotation relative to said first rotary component; and
a range actuator moveable to three distinct range positions to establish three distinct drive connections between said input shaft and said first and second output shafts, said range actuator is operable in a first range position to interconnect said first output shaft to said input shaft for establishing a two-wheel high-range drive connection, said range actuator is operable in a second range position to interconnect said first output shaft and said transfer component to said input shaft for establishing a four-wheel high-range drive connection, and said range actuator is operable in a third range position to interconnect said first rotary component of said planetary gearset to said input shaft and interconnect said second rotary component of said planetary gearset to said first output shaft and said transfer component for establishing a four-wheel low-range drive connection, wherein said first and second rotary components of said planetary gearset are stationary when said range actuator is located in its first and second range positions.

10. The transfer case of claim 9 wherein said transfer component includes a first sprocket rotatably surrounding said input shaft, and wherein a second sprocket is fixed to said second output shaft and is drivingly connected to said first sprocket via a chain encircling said first and second sprockets, wherein said range actuator is operable in its first range position to couple said first output shaft to said input shaft and uncouple said first sprocket from said input shaft, wherein said range actuator is operable in its second range position to couple said first output shaft and said first sprocket to said input shaft, and wherein said range actuator is operable in its third range position to couple said first rotary component of said planetary gearset with said input shaft and to couple said second rotary component of said planetary gearset to said first output shaft and said first sprocket.

11. The transfer case of claim 9 wherein said range actuator is operable in its first range position to couple said first output shaft for common rotation with said input shaft, wherein said range actuator is operable in its second range position to couple said first output shaft and said transfer component for common rotation with said input shaft, and wherein said range actuator is operable in its third range position to couple said first rotary component of said planetary gearset for common rotation with said input shaft and to couple said second rotary component of said planetary gearset for common rotation with said first output shaft and said transfer component.

12. The transfer case of claim 11 wherein said first rotary component of said planetary gearset is a sun gear and said second rotary component is a carrier, and wherein said planetary gearset further comprising a non-rotatable ring gear and pinion gears rotatably mounted to said carrier, said pinion gears being in meshed engagement with said sun gear and said ring gear.

13. The transfer case of claim 12 wherein said range actuator includes first, second and third range sleeves and a range shift mechanism for concurrently moving said first, second and third sleeves between said first, second and third range positions, wherein said range actuator is operable in its first range position so as to cause said second range sleeve to drivingly interconnect said first output shaft for common rotation with said input shaft, wherein said range actuator is operable in its second range position so as to cause said second range sleeve to maintain a driving interconnection between said input shaft and said first output shaft while also causing said third range sleeve to drivingly interconnect said transfer component for common rotation with said input shaft, and wherein said range actuator is operable in its third range position so as to cause said second range sleeve to drivingly interconnect said sun gear for common rotation with said input shaft, to cause said first range sleeve to drivingly interconnect a first carrier member of said carrier for common rotation with said first output shaft, and to cause said third range sleeve to drivingly interconnect a second carrier member of said carrier for common rotation with said transfer component.

14. The transfer case of claim 13 wherein said first, second and third range sleeves abut in a series relationship and are rotatable relative to reach other, and wherein said first, second and third range sleeves are coaxially aligned with said input shaft and said first output shaft.

15. The transfer case of claim 14 wherein said first range sleeve is splined for rotation with said first output shaft and has clutch teeth configured to engage clutch teeth formed in said first carrier member when located in said third range position, wherein said second range sleeve has internal splines meshed with external splines formed on said first output shaft and said input shaft when located in said first and second range positions and which only mesh with said external splines on said input shaft when located in said third range position, said second range sleeve further including clutch teeth configured to engage clutch teeth formed on said sun gear when located in said third range position, and wherein said third range sleeve is splined for common rotation with said transfer unit and includes internal splines configured to engage external splines formed on said input shaft when located in said second and third range positions, said third range sleeve further including clutch teeth configured to engage clutch teeth formed on said second carrier member when located in said third range position.

16. The transfer case of claim 15 further comprising a first connector operably disposed between said first and second range sleeves and configured to facilitate common axial movement while permitting relative rotation therebetween, and a second connector operably disposed between said second and third range sleeves and configured to facilitate common axial movement while permitting relation rotation therebetween.

17. The transfer case of claim 9 further comprising a power-operated device for selectively moving said range actuator between its first, second and third range positions.

18. A transfer case, comprising:
an input shaft rotatable about a first rotary axis;
a first output shaft rotatable about said first rotary axis relative to said input shaft;
a second output shaft rotatable about a second rotary axis offset from said first rotary axis;
a transfer component driven by said second output shaft and rotatable about said first rotary axis;
a planetary gearset coaxially aligned with said first rotary axis and including a first rotary component and a second rotary component supported for rotation relative to said first rotary component; and
a range actuator moveable between three distinct range positions to establish three distinct drive connections between said input shaft and said first and second output shafts, said range actuator is operable in a first range position to interconnect said first output shaft to said input shaft for establishing a two-wheel high-range drive connection, said range actuator is operable in a second range position to interconnect said first output shaft and said transfer component to said input shaft for establishing a four-wheel high-range drive connection, and said range actuator is operable in a third range position to interconnect said first rotary component of said planetary gearset to said input shaft and interconnect said second rotary component of said planetary gearset to said first output shaft and to said transfer component for establishing a four-wheel low-range drive connection, wherein said first and second rotary components of said planetary gearset are stationary when said range actuator is located in its first and second range positions.

19. The transfer case of claim 18 wherein said transfer component includes a first sprocket rotatably surrounding said input shaft, and wherein a second sprocket is fixed to said second output shaft and is drivingly connected to said first sprocket via a chain encircling said first and second sprockets, wherein said range actuator is operable in its first range position to couple said first output shaft to said input shaft and uncouple said first sprocket from said input shaft, wherein said range actuator is operable in its second range position to couple said first output shaft and said first sprocket to said input shaft, and wherein said range actuator is operable in its third range position to couple said first rotary component of said planetary gearset with said input shaft and to couple said second rotary component of said planetary gearset to said first output shaft and said first sprocket.

20. The transfer case of claim 18 wherein said range actuator is operable in its first range position to couple said first output shaft for common rotation with said input shaft, wherein said range actuator is operable in its second range position to couple said first output shaft and said transfer component for common rotation with said input shaft, and wherein said range actuator is operable in its third range position to couple said first rotary component of said planetary gearset for common rotation with said input shaft and to couple said second rotary component of said planetary gearset for common rotation with said first output shaft and said transfer component.

21. The transfer case of claim 20 wherein said first rotary component of said planetary gearset is a sun gear and said second rotary component is a carrier, and wherein said planetary gearset further comprising a non-rotatable ring gear and pinion gears rotatably mounted to said carrier, said pinion gears being in meshed engagement with said sun gear and said ring gear.

* * * * *